United States Patent [19]

Baddour

[11] Patent Number: 5,433,482
[45] Date of Patent: Jul. 18, 1995

[54] WELDLESS PIPE REPAIR APPARATUS AND METHOD

[75] Inventor: Alfred R. Baddour, Houston, Tex.

[73] Assignee: Oceaneering International, Inc., Houston, Tex.

[21] Appl. No.: 106,684

[22] Filed: Aug. 16, 1993

[51] Int. Cl.⁶ ............................................. F16L 21/06
[52] U.S. Cl. ....................................... 285/31; 285/96; 285/101; 285/323; 405/169; 405/170
[58] Field of Search ................ 405/188, 190, 191, 169, 405/170, 171, 158; 285/31, 104, 105, 96, 101, 322, 323, 18, 93

[56] References Cited

U.S. PATENT DOCUMENTS

| | | | |
|---|---|---|---|
| 2,593,491 | 4/1952 | Saunders et al. | 285/31 X |
| 2,845,283 | 7/1958 | Kuhn | 285/166 |
| 3,658,366 | 4/1972 | Welch et al. | 285/31 X |
| 3,830,526 | 8/1974 | Mohr | 285/18 |
| 3,986,728 | 10/1976 | Marsh | 285/18 |
| 4,057,268 | 11/1977 | Sicard | 285/323 X |
| 4,188,050 | 2/1980 | Lochte | 285/166 X |
| 4,437,486 | 3/1984 | Bianchi | 137/315 |
| 4,443,129 | 4/1984 | Sivry et al. | 405/188 X |
| 4,471,799 | 9/1984 | Buck | 137/315 |
| 4,531,766 | 7/1985 | Crase | 285/18 |
| 4,761,023 | 8/1988 | Troxell | 285/31 X |
| 4,858,958 | 8/1989 | Harbeke | 285/31 |
| 4,909,281 | 3/1990 | Reaux | 138/97 |
| 4,911,196 | 3/1990 | Kemp | 137/220 |
| 5,056,830 | 10/1991 | Reaux | 285/15 |

Primary Examiner—Dennis L. Taylor
Attorney, Agent, or Firm—Fulbright & Jaworski

[57] ABSTRACT

A pipeline connector and repair system for sealingly connecting the ends of first and second pipes together without welding or bolting. First and second connectors are provided at each end of a pipe joint and are inserted between the ends of the first and second pipes to be connected, the connectors are extended outwardly for enclosing the ends of the first and second pipes, and dual slip means and dual seal means in each of the connectors are hydraulically set for making the repair.

15 Claims, 10 Drawing Sheets

WELDLESS PIPE REPAIR APPARATUS AND METHOD

BACKGROUND OF THE INVENTION

Pipeline repairs are becoming more common as existing pipe networks age. In particular, a need exists in underwater pipeline repairs for a simple, reliable weld-free mechanical connector. The present invention is directed to a connector and repair system that does not require welding, and does not require flange bolting. Instead, the present invention uses hydraulic cylinders and pistons to actuate slip mechanisms and seals as well as longitudinally positioning the connectors.

SUMMARY

The present invention is directed to a pipeline connector for sealingly connecting the ends of first and second pipes together and includes a housing having a bore therethrough and having first and second ends for receiving the first and second pipes, respectively. First, second, third and fourth oppositely movable pistons are provided in the housing. First seal means and first slip means are provided in the housing actuated by the first and second pistons, respectively, for engaging the first pipe. Third and fourth oppositely movable pistons are provided in the housing and second slip means and second seal means are provided in the housing actuated by the third and fourth pistons, respectively, for engaging the second pipe.

Still a further object of the present invention is wherein coacting locking means are provided between the housing and each of the first and fourth pistons for engaging when the first and second seal means are set thereby providing a load limiting device preventing the seals from becoming over-stressed.

A further object is the provision of coacting locking means between the housing and each of the second and third pistons for engaging when the first and second slips means and set thereby providing permanent and irreversible engagement of the slip means into first and second pipes.

Still a further object of the present invention is the provision of piston and cylinder means connected to the housing and one of the pipes for longitudinally moving the housing relative to the pipes.

Yet a still further object of the present invention is the provision of a pipe engaging support connected to one end of the housing for engaging one of the pipes for aligning and supporting the housing. Preferably, the pipe engaging support is arcuately shaped.

Yet a still further object of the present invention is wherein one end of the housing includes an interior surface surrounding the bore and having first and second sections tapered inwardly for aligning a pipe inserted into the one end. Preferably, the first and second sections are separated by a uniform section and preferably the tapered section nearest the one end has a greater taper than the other tapered section.

Still a further object of the present invention is the provision of a pipeline connector system for inserting into spaced ends of first and second pipes for sealingly connecting said pipes together. The system includes first and second housings each having a bore therethrough, and including first and second joints positioned in one end of each of the housings, respectively, and said joints are adapted to be connected together. Each of the housings include two hydraulically actuated slip means and two hydraulically actuated seal means. First piston and cylinder piston means are connected between the first housing and the first joint for longitudinally moving the first housing relative to the first joint, and second piston and cylinder means are connected to the second housing and the second joint for longitudinally moving the second housing relative to the second joint.

Still a further object of the present invention is the method of sealingly connecting the spaced ends of first and second pipes together with a pipe joint having a connector at each end of the pipe joint and longitudinally movable thereon in which each connector includes dual slip means and dual seal means. The method includes retracting the connectors towards the center of the pipe joint, inserting the pipe joint between the ends of the first and second pipes, extending the connectors outwardly for enclosing the end of the first pipe in one connector and enclosing the end of the second pipe in the other connector, and hydraulically setting the dual slip means and dual seal means in each connector for gripping and sealing one of the slip means and one of the seal means against each end of the pipe joint and the ends of the first and second pipes.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIGS. 5, 6, 7, 8 and 9 are schematic elevational views, in sequence, illustrating the method of inserting the pipeline repair system of FIG. 1 into spaced ends of first and second pipes for sealingly connecting the pipes together in which FIG. 5 illustrates lowering the assembly into position, FIG. 6 indicates supporting one end of the system from one of the pipes, FIG. 7 illustrates supporting the entire system from both of the pipes, FIG. 8 illustrates extending one of the connectors for engaging one of the pipes, and FIG. 9 illustrates both of the connectors extended with one of the connectors being secured and sealed to one of the pipes, FIGS. 1A, 11B and 11C are schematic illustrations, in sequence, illustrating the alignment of an entry pipe into the double tapered end of FIG. 10.

DESCRIPTION OF THE PREFERRED EMBODIMENT

As the present invention is particularly useful in replacing defective sections of underwater pipelines, the present invention will be described in such application which utilizes dual connectors of the present invention. It is to be understood that in other applications, a single connector may be used.

Figure 1:
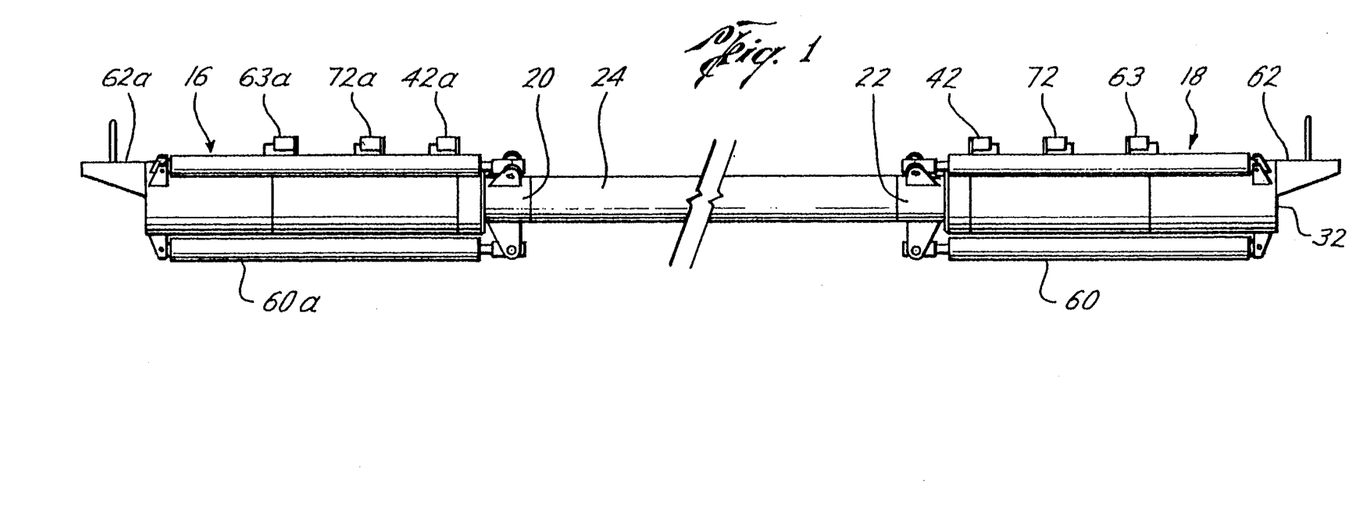
FIG. 1 is a schematic elevational view of a pipeline repair system having a connector at each end and shown in a retracted position.
Figure 5:
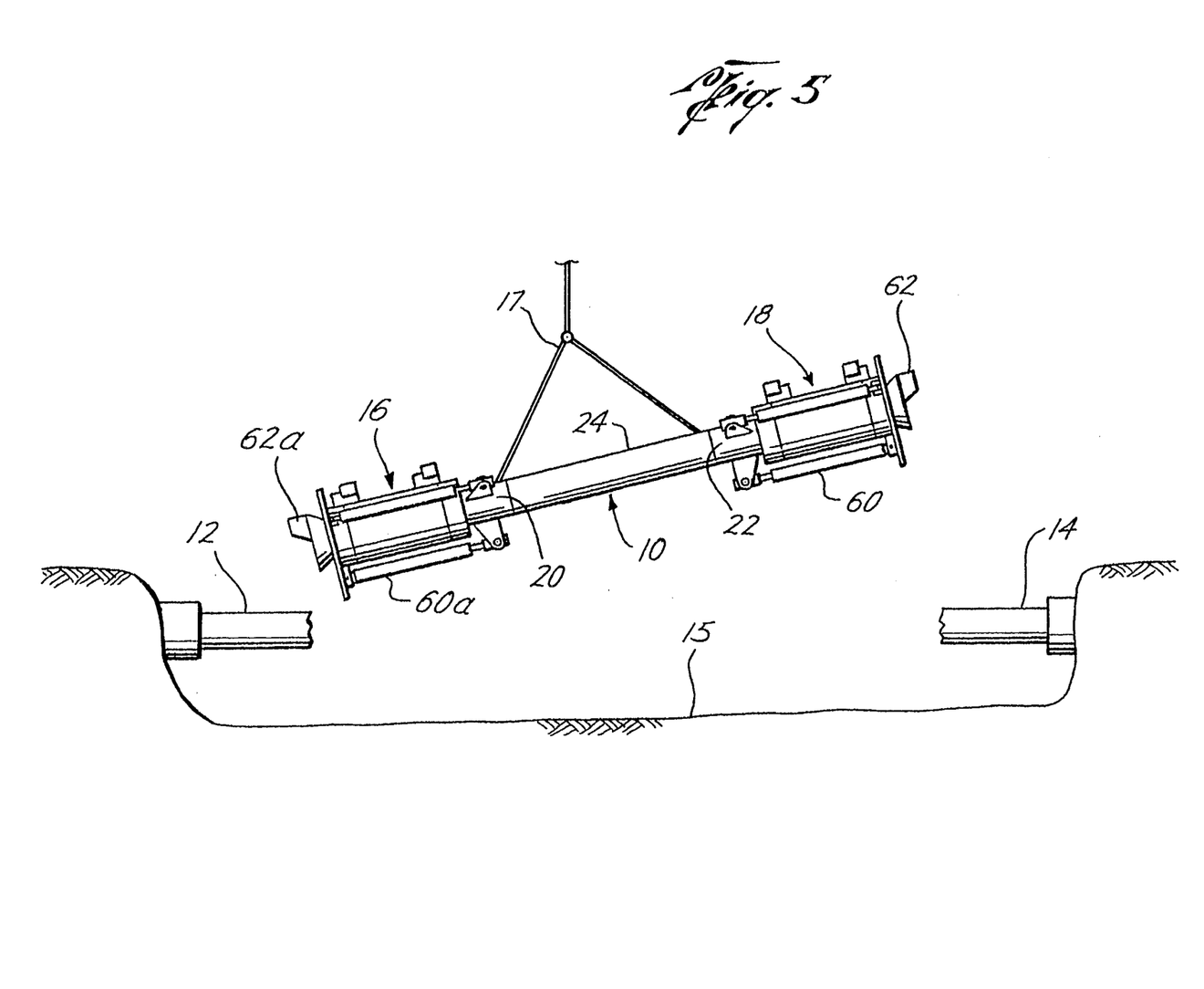

Referring now to the drawings, and particularly to FIGS. 1 and 5, the reference numeral 10 generally indicates the pipeline repair system of the present invention for inserting into spaced ends of first pipe 12 and second pipe 14 positioned underwater in which a defective section of the pipeline has been removed. The repair system generally includes a first connector 16, a second connector 18, which is a mirror image of the first connector 16, a first pup joint 20 connected to the first connector 16, a second pup joint 22 connected to the connector 18 and a spool piece 24 connected to the pup joints 20 and 22. The pup joints 20 and 22 and the spool piece 24 form a pipe joint of substantially a length to fit between the ends of the first pipe 12 and second pipe 14 of FIG. 5. Since the connectors 16 and 18 are mirror images of each other, only the connector 18, which is shown in greater detail of FIG. 2 will be described in detail and corresponding parts of connector 16 will be similarly numbered with the addition of the suffix "a". The connector 18 includes a housing 26 having a bore 28 therethrough and includes a first end 30 and a second end 32 for receiving first and second pipes, respectively, and as shown here the pup joint 22 and the pipe 14 (FIG. 5).

Figure 2:
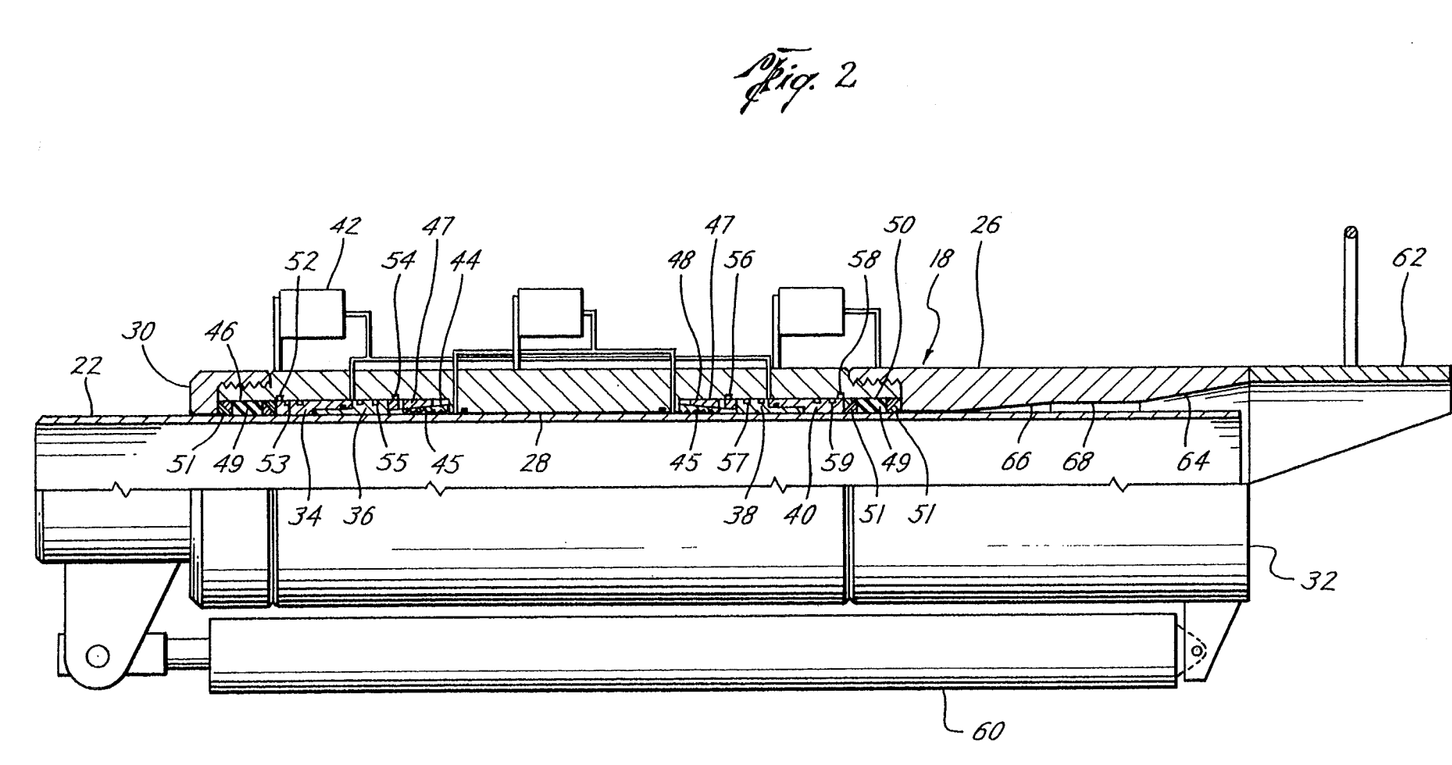
FIG. 2 is an enlarged elevational view, partly in cross section of one of the connectors of FIG. 1 shown in the retracted position.

A first piston 34 and a second oppositely movable piston 36 are provided in the housing 26. Spaced from the first and second pistons 34 and 36 are third piston 38 and oppositely movable piston 40 in the housing 26. All of the pistons 34, 36, 38 and 40 are actuated by providing hydraulic fluid to a hydraulic connector 42. First slip means 44 and second seal means 46 are provided in the housing and are actuated by the second piston 36 and first piston 34, respectively, for engaging and sealing against a first pipe, here the pup joint 22. Second slip means 48 and second seal means 50 are provided in the housing 26 and are actuated by the third and fourth pistons 38 and 40, respectively, for engaging a second pipe, such as 14. The slip means 44 and 48 each include conventional cone segments with teeth 45 and wedges 47. The seal means 46 and 50 may be any suitable seal such as an elastomeric seal 49 with anti-extrusion devices 51 on either side.

Figure 3:
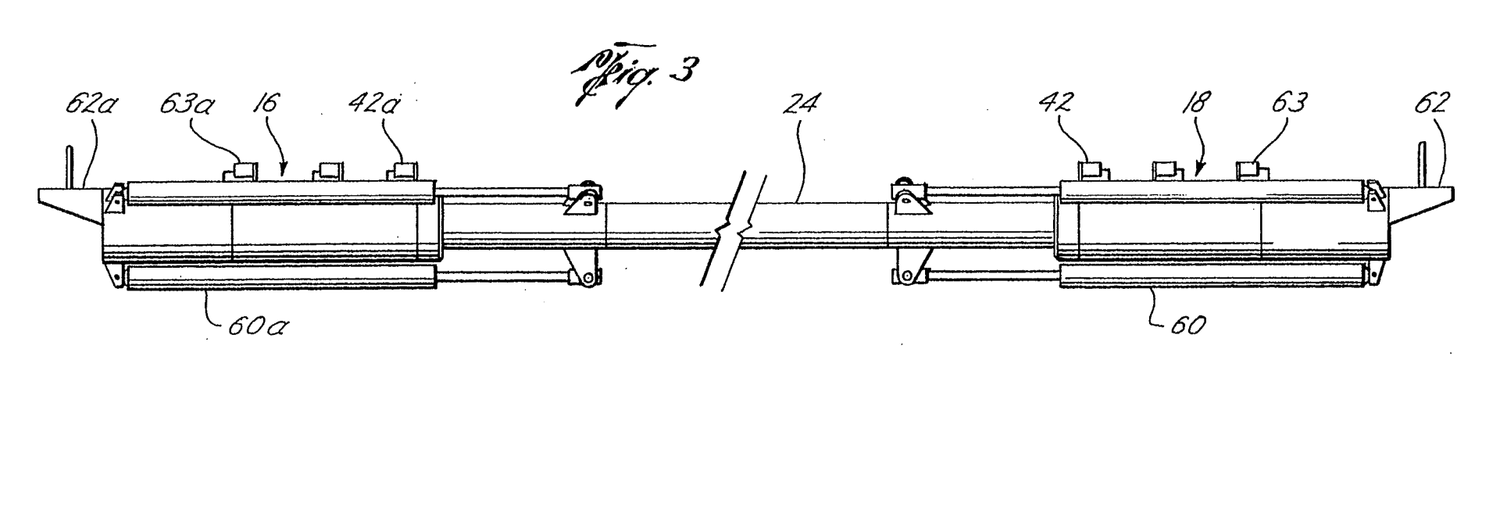
FIG. 3 is a schematic elevational view similar to FIG. 1 in which the connectors are shown in the extended position.
Figure 4:
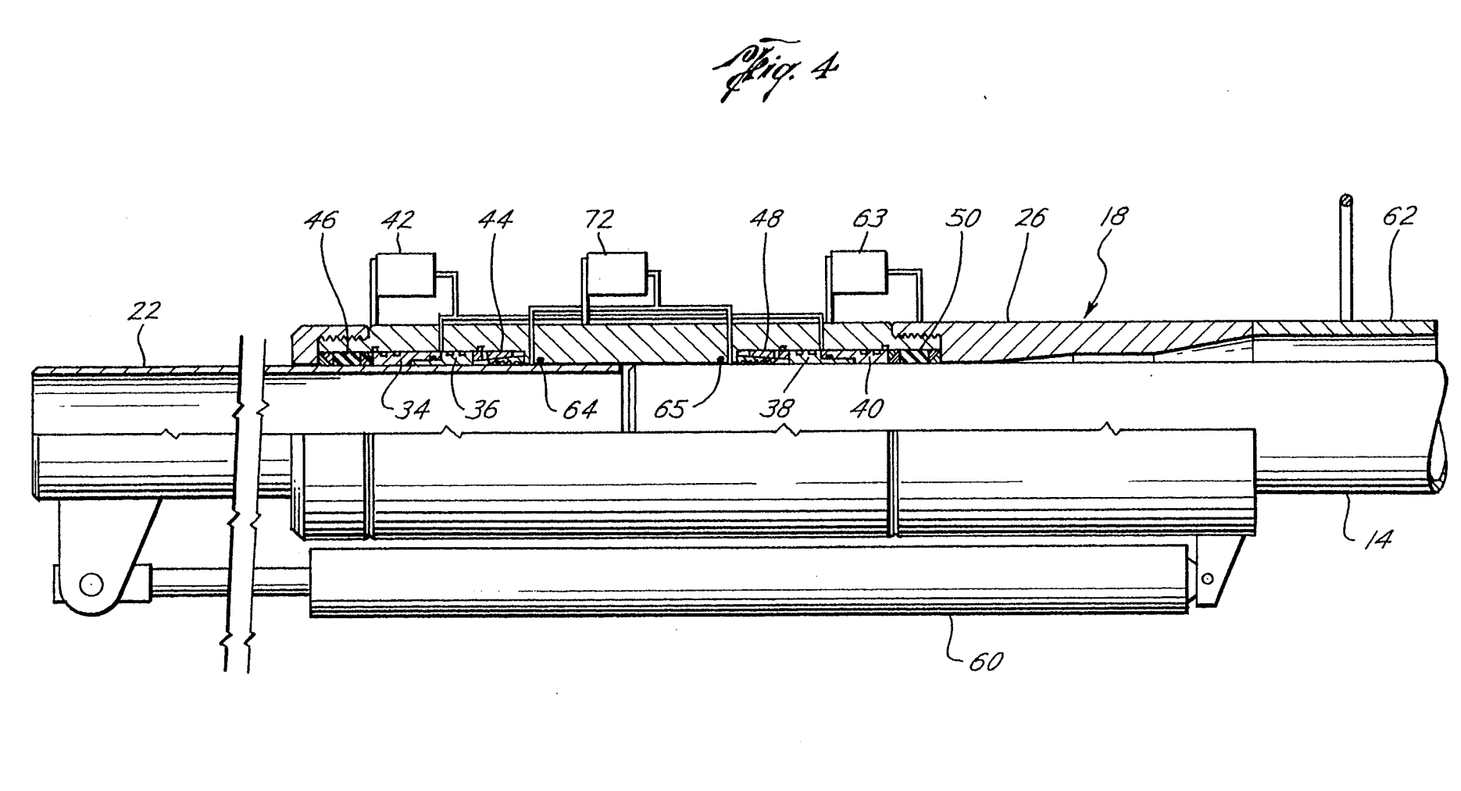
FIG. 4 is an enlarged elevational view, partly in cross section, of one of the connectors of FIG. 3 and is similar to FIG. 2 except the connector is shown in the extended position.

Coacting locking means are provided between the housing 26 and each of the pistons 34, 36, 38 and 40, such as locking rings 52, 54, 56 and 58 which lock in grooves 53, 55, 57 and 59, respectively. The locking rings 52 and 58 provide a load limiting device preventing the elastomeric seals 49 from becoming overstressed. The locking rings 54 and 56 lock the slips 44 and 48 in place and prevent their unloading. One or more positioning hydraulic actuators 60 are provided connected to the housing 26 and one of the pipes, here the pup joint 22, for longitudinally moving the housing 26 relative to the pup joint 22 and the pipe 14. Thus, the housing 26 can be positioned in a retracted position as shown in FIGS. 1 and 2 for insertion into the space between the pipes 12 and 14 of FIG. 5, but can be placed in an extended position as best seen in FIGS. 3 and 4 for ensuring that the first slip means 44 and the first seal means 46 engage the first pipe, here the pup joint 22, while the second slip means 48 and the second seal means 50 engage the pipe 14. The actuators 60 and 60a are connected to and actuated by hydraulic connectors 63 and 63a, respectively.

Figure 6:
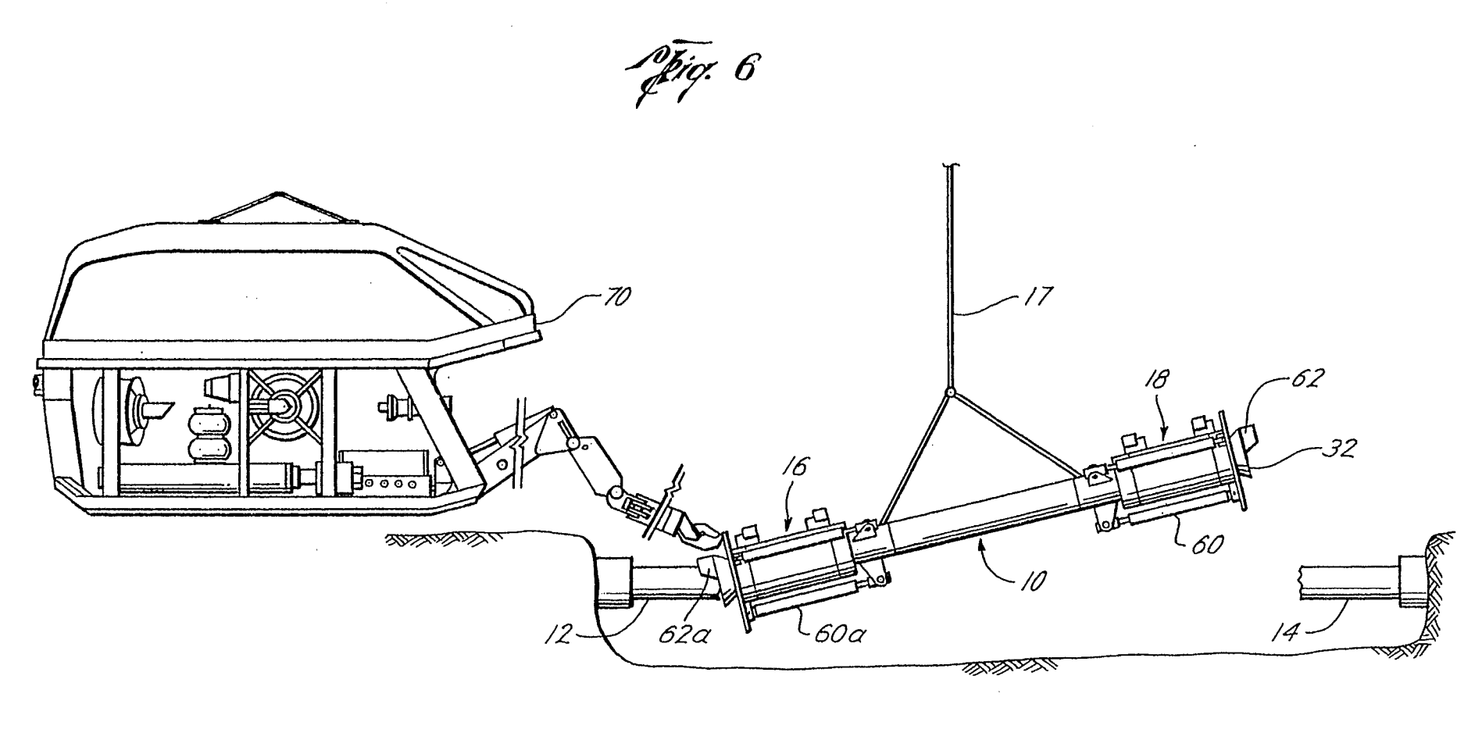
Figure 7:
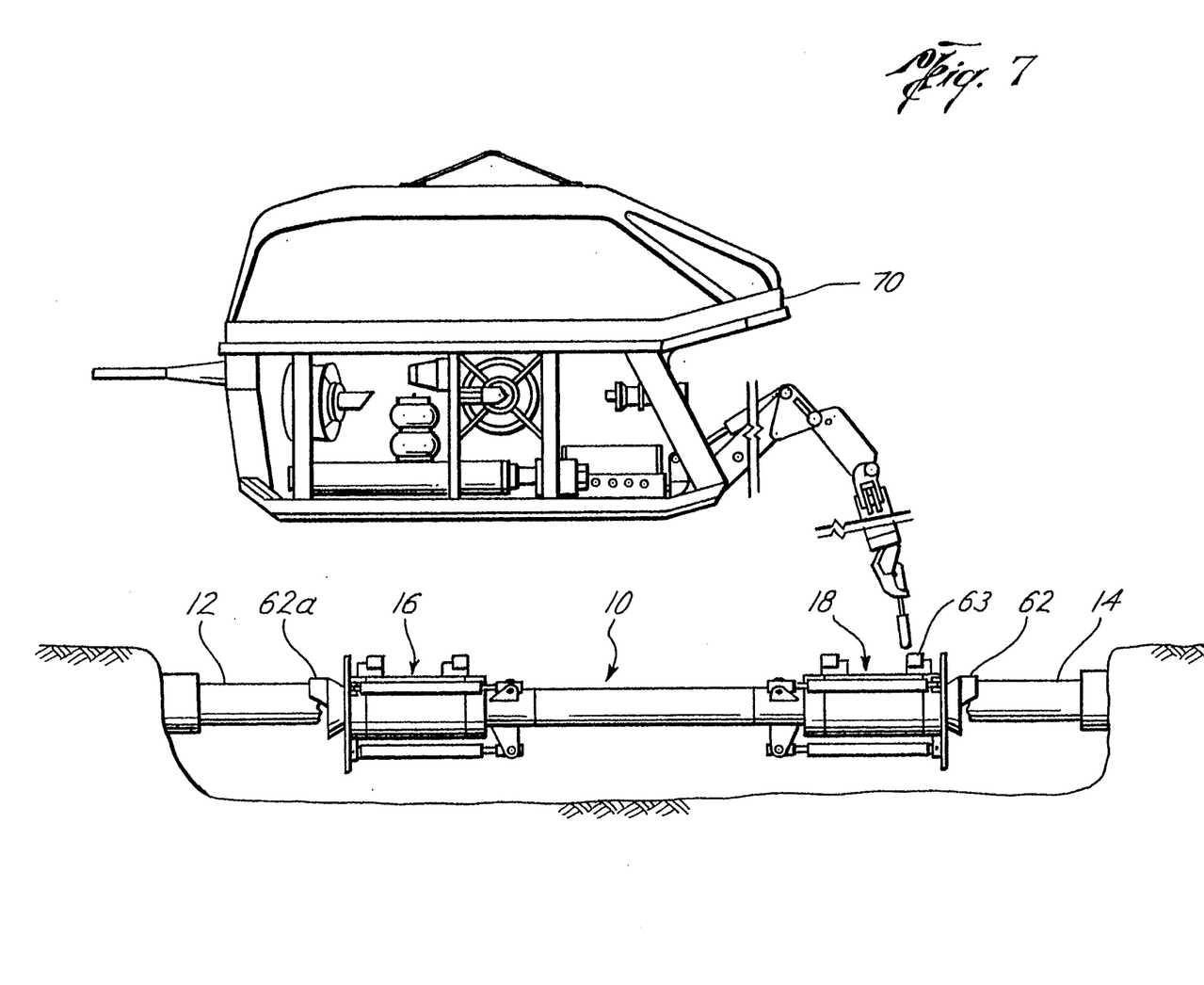

Referring now to FIGS. 1–4, a pipe engaging support or visor 62 and 62a are connected to one end of the housing of the connectors 18 and 16, respectively, for engaging a pipe for aligning and supporting the housing with the pipe, as best seen in FIGS. 6 and 7 as will be more fully discussed hereinafter. In addition, one end of the housing 26 (FIG. 2) includes an interior surface surrounding the bore 28 having a first 64 and a second 66 tapered section which are tapered inwardly for the purpose of aligning a pipe inserted into the end 32. That is, the pipes 12 and 14 (FIG. 5) may not be fully aligned and as will be more fully discussed hereinafter, the tapered sections 64 and 66 assist in aligning a pipe that is inserted in the end 32.

Figure 8:
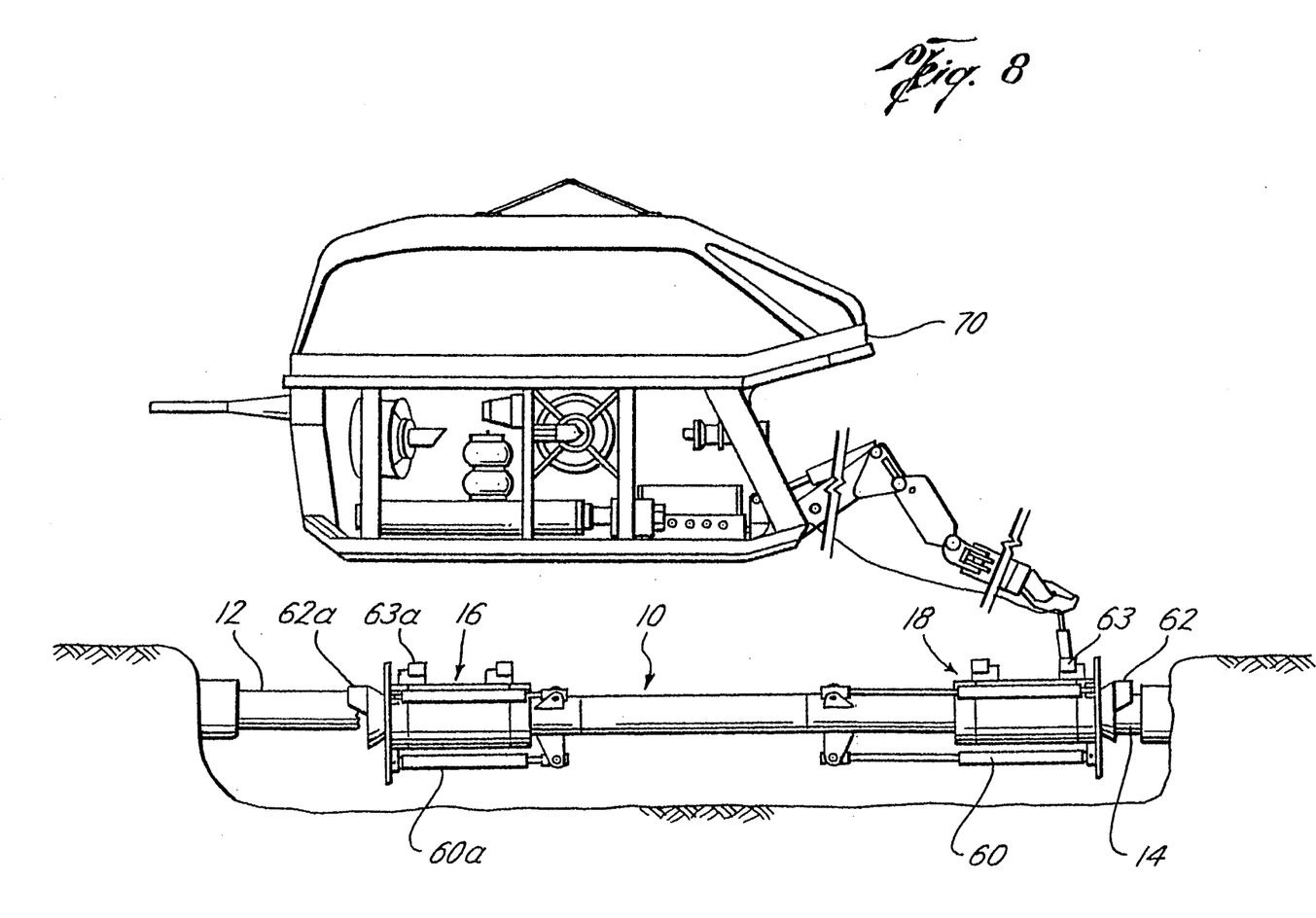
Figure 9:
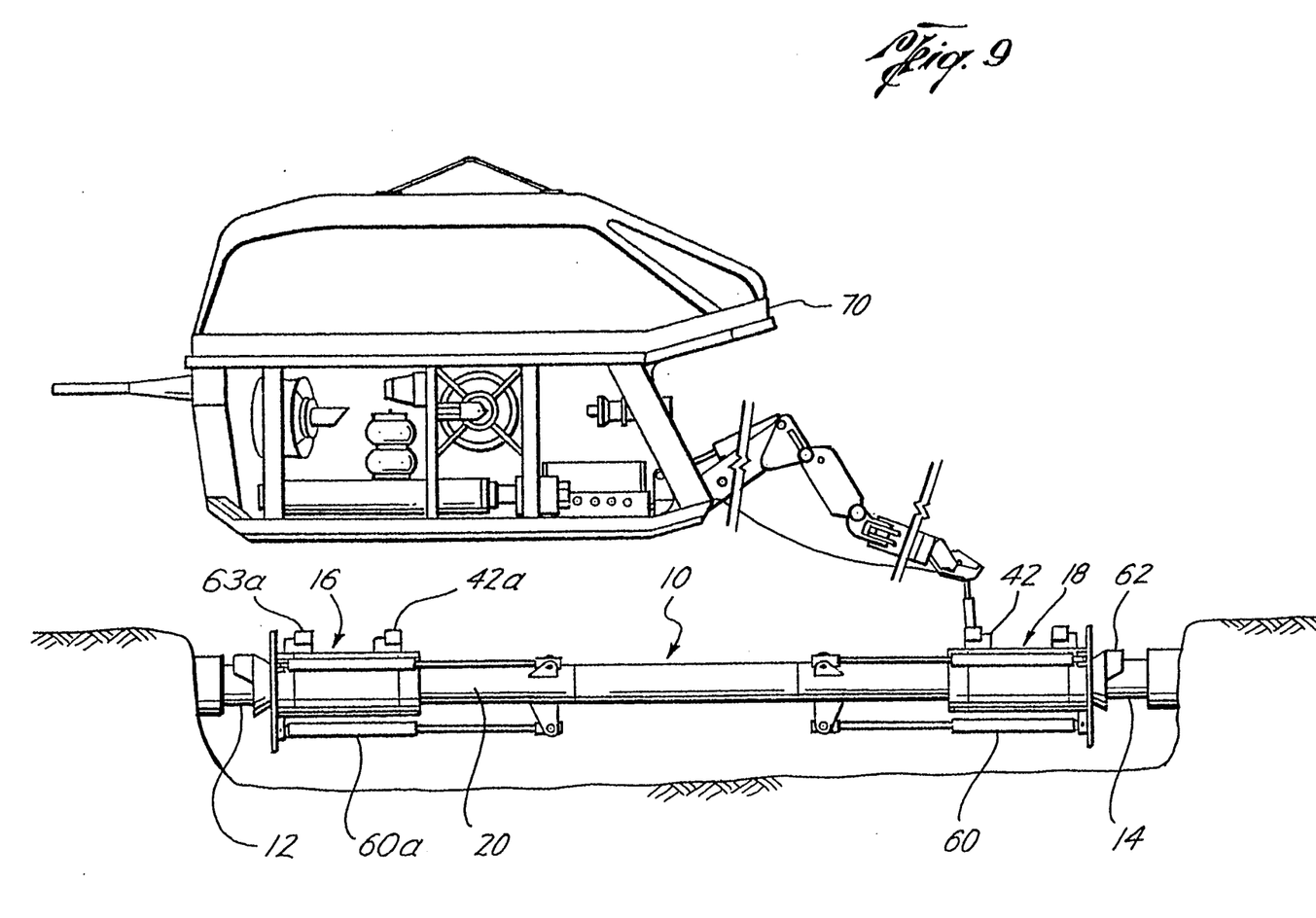

The method of utilizing the pipeline repair system 10 of FIGS. 1–4 for replacing a defective portion of a pipeline is best seen by referring to FIGS. 5–9. In FIG. 5, the defective portion of the pipeline has been removed and the waterbed 15 below the pipeline is removed, and the ends of the pipes 12 and 14 have had all coatings removed and are cleaned. However, the ends of the pipe 12 and 14 are not required to be machined as the connectors 16 and 18 are designed to attach and seal against unmachined rough pipe ends. As best seen in FIG. 5, the system 10 is prepared with the proper length of spool piece 24 welded to the pup joints 20 and 22 and the connectors 16 and 18 are placed in a retracted position such as shown in FIGS. 1 and 2. The system 10 is lowered into the water by a line 17 into the space between the ends of the pipes 12 and 14. As best seen in FIG. 6, the system 12 is lowered as a unit and may be guided by any suitable means such as a conventional ROV 70 (remote operating vehicle) to one of the pipes, such as 12. Preferably, the system 10 is inclined, such as 20°, to ensure that the opposite end remains elevated above the work site while the connector 16 is being lowered onto the pipe 12 for preventing excessive sand and silt from entering the connector 18. The pipe engaging support or visor 62a is set down on top of the pipe 12 thereby aligning and supporting the connector 16 from the pipe 12. Further lowering of the system 10 brings the pipe engaging support 62 down on top of the pipe 14. This lands the system 10 onto and supported between the pipes 12 and 14, as best seen in FIG. 7. With the system 10 in place, the ROV 70, or other means such as a diver, makes a hydraulic connection to the connector 63 on the connector 18 and as best seen in FIG. 8 actuates the positioning actuators 60 to extend the connector 18 to enclose the pipe 14 into the connector 18, as best seen in FIG. 4. The ROV 70 will then move to the hydraulic connection 63a on the connector 16 to actuate the positioning hydraulic actuators 60a to similarly move the connector 16 over the pipe 12. Thus, as best seen in FIG. 9, with the ends of the pipes 12 and 14 positioned inside of the connectors 16 and 18, the ROV, or other means, makes a hydraulic connection with connector 42 in the connector 18 for actuating the pistons 34, 36, 38 and 40, as best seen in FIG. 4, thereby setting the slips 44 and the seal means 46 against the exterior of the pup joint 22 and gripping and sealing the slip means 48 and the seal means 50 against the pipe 14. Thereafter, the ROV moves to the other end of the system 10 to the hydraulic connection 42a to similarly actuate the connector 16 to grip and seal against the pup joint 20 and the pipe 12.

In addition, the lock rings 52, 54, 56 and 58 will engage the pistons 34, 36, 38 and 40, respectively, for limiting the load applied to the seals 48 and 50 and preventing their extrusion and for locking the slips fully in place and preventing their release. As a backup, if desired, a check valve can be used in the hydraulic lines to effect a fluid lock or epoxy can be substituted for hydraulic oil. Referring now to FIG. 4, another hydraulic connector 72 is provided which is connected to test lines for applying hydraulic pressure to the housing of the connectors 16 and 18 between the seals 46 and 64 and between 65 and 50 whereby the repair can be tested and verified to provide positive information on the integrity of the repair.

While the foregoing description of the invention has been described in connection with a system having two connectors, it is to be understood that in some repair situations, a single connector can be connected to one pipe, such as by weld or a flange, and be extended to connect to a second pipe, or even used as an outside coupling between two pipes.

Figure 10:
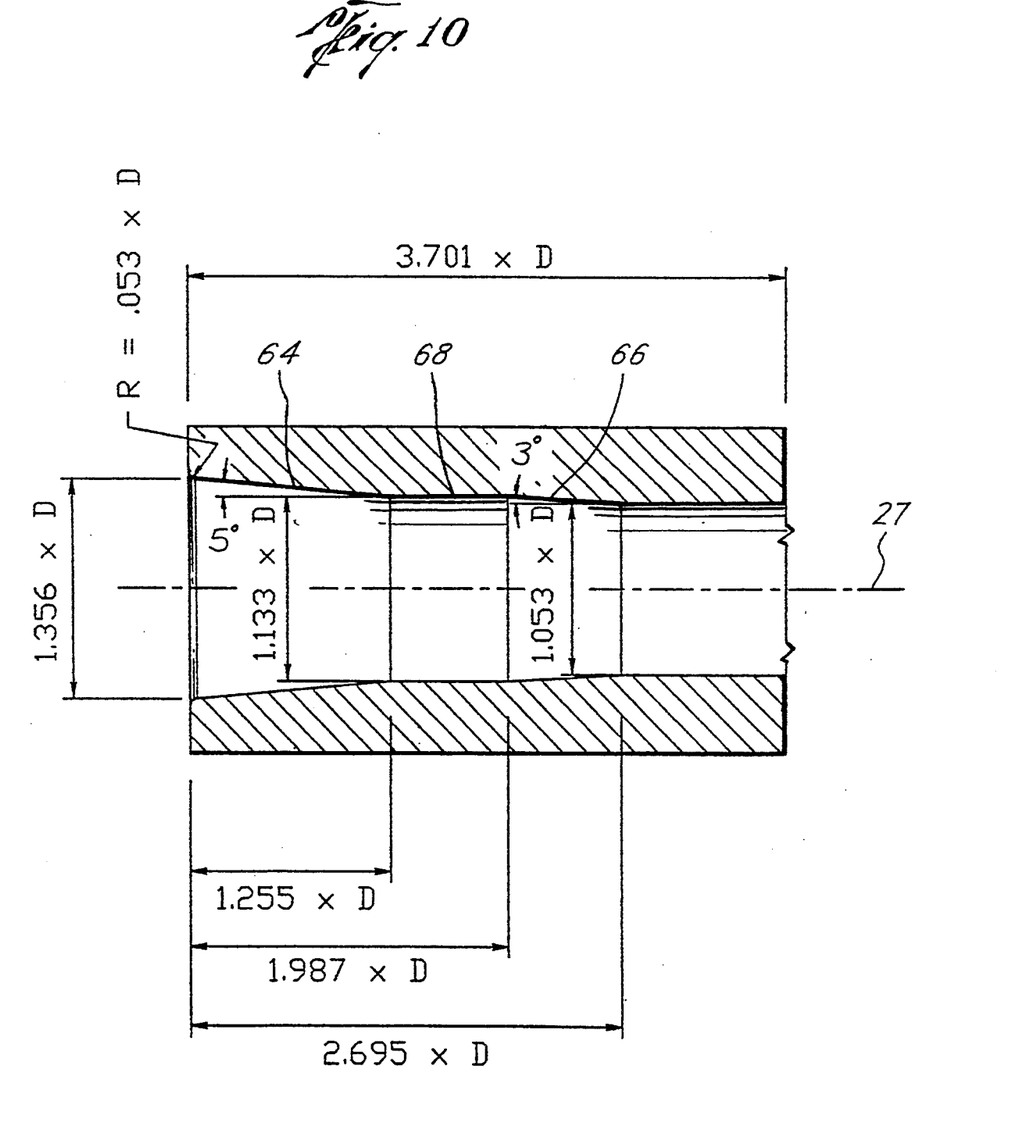
FIG. 10 is an enlarged fragmentary elevational view in cross section of one end of the connectors illustrating a double tapered entry for aligning a pipe entering the connector.

Referring now to FIG. 10, a fragmentary cross-sectional view of the double tapered end of each of the housings of the connectors 16 and 18 is shown for receiving the pipes 12 and 14, respectively. The preferred numerical values of the sizes and shapes of the double tapered sections 64 and 66 which are separated by uniform section 68 is best seen. The purpose of the double tapered section is to align an incoming pipe. That is, the pipes 12 and 14 may not be fully aligned. Therefore, the purpose of the double tapered section is to align the pipes 12 and 14 and to allow the connectors to enclose the pipe ends so that the various slip means and seal means will more completely and fully engage, grip, and seal on the pipes 12 and 14.

Figure 11A:
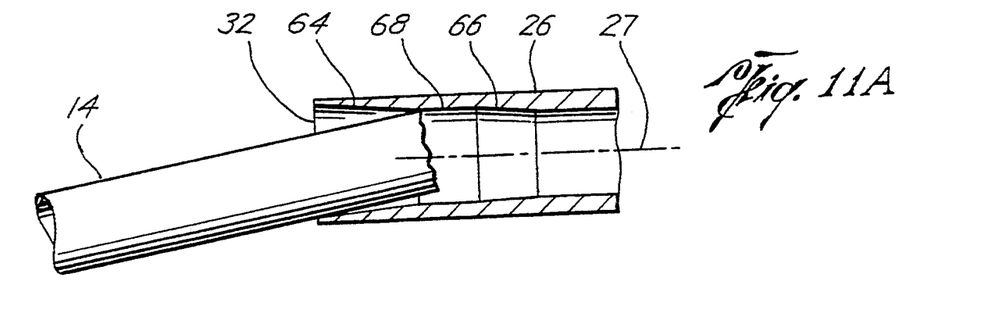
Figure 11B:
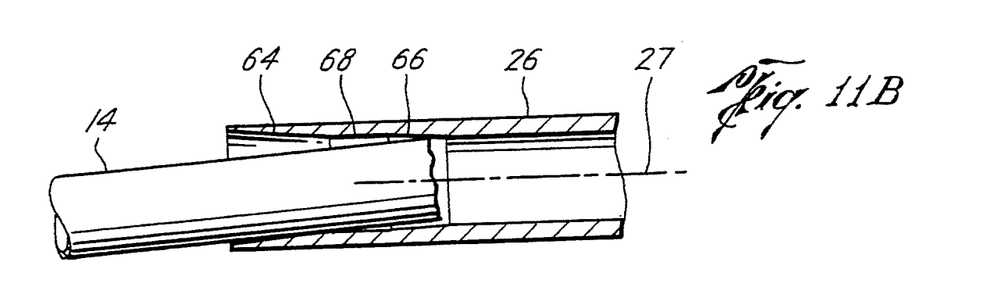
Figure 11C:
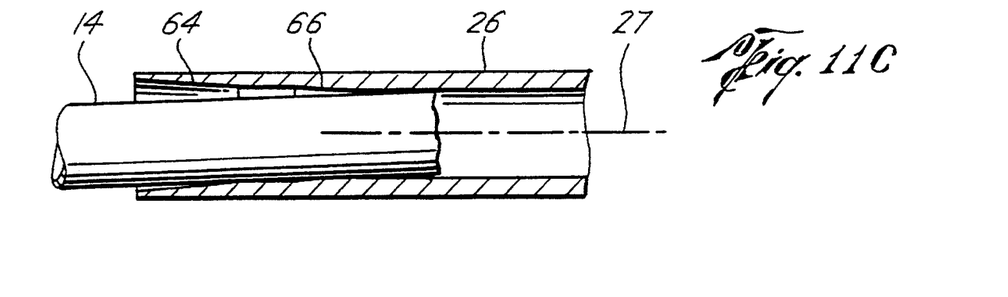

Referring now to FIG. 11A, the end 32 of the housing 26 of the connector 18 is shown moving relative to the pipe 14 and the misalignment of the pipe 14 relative to the longitudinal axis 27 is exaggerated. It is to be noted that the tapered section 64 has a greater inward taper than the second tapered section 66 for providing an enlarged receiving opening. For example only, the taper of section 64 may be 5° while the taper of the second section 66 may be 3°. In FIG. 11A, the enclosure of pipe 14 pushes its end against the first tapered section 64 and its side against the end 32 of the housing 26. This creates a torque tending to bring the pipe 14 into alignment with the axis 27 of the housing 26. The length, diameter, and amount of taper, as set forth in FIG. 10, relative to diameter D of the inserted pipe 14 is selected to obtain the desirable alignment. For instance, the longitudinal length of tapered section 64 is greater than the longitudinal length of the uniform section 68 and the second tapered section 66 and has a larger bore for more easily engaging the pipe 14 and applying torsional forces to properly direct its end. The uniform section 68 is larger than the nominal bore size of housing 26 and then allows the entry pipe 14 to move further into the housing 26 and has a length to provide a geometry to to provide a moment arm to align pipe 14. The second tapered section 66 performs the function of receiving the aligned pipe 14. The geometry of the housing 26 provides contact points between the pipe 14 and the housing 26 which are no less than one D of the pipe 14 apart.

The present invention, therefore, is well adapted to carry out the objects and attain the ends and advantages mentioned as well as others inherent therein. While a presently preferred embodiment of the invention has been given for the purpose of disclosure, numerous changes in the details of construction, and steps of the process will be readily apparent to those skilled in the art, and which are encompassed within the spirit of the invention and the scope of the appended claims.

What is claimed is:

1. A pipeline connector for sealingly connecting the ends of first and second pipes together comprising, a housing having a bore therethrough and having first and second ends for receiving the first and second pipes, respectively, a pipe engaging support connected to one end of the housing for engaging one of the pipes for aligning and supporting the housing, first and second oppositely movable pistons in the housing, first seal means in the housing and first slip means in the housing actuated by said first and second pistons, respectively, for engaging said first pipe, third and fourth oppositely movable pistons in the housing, second slip means in the housing and second seal means in the housing actuated by the third and fourth pistons respectively, for engaging said second pipe.

2. The connector of claim 1 including, coacting locking means between the housing and each of the first piston and the fourth piston engaging when the first and second seal means are set.

3. The connector of claim 1 including, coacting locking means between the housing and each of the second and third pistons engaging when the first and second slip means are set.

4. The connector of claim 1 including, hydraulic actuator means connected to the housing and one of the pipes for longitudinally moving the housing relative to the pipes.

5. The connector of claim 1 wherein one end of the housing includes an interior surface surrounding the bore having first and second sections tapered inwardly for aligning a pipe inserted into said one end.

6. The connector of claim 5 wherein the first and second sections are separated by a uniform section.

7. A pipeline repair system for inserting into spaced ends of first and second pipes for sealingly connecting said pipes together comprising, an integral tubular member substantially equal in length to the distance between said first and second pipes, said tubular member having the same diameter as said first and second pipes, first and second housings each having a bore therethrough and each being telescopically positioned on the tubular member, each of the housings including two hydraulically actuated slip means and two hydraulically actuated seal means, first actuator means connected between the first housing and the tubular member for longitudinally moving the first housing relative to the tubular member for telescopically engaging the first pipe and positioning of the first seal means of the first housing against the tubular member and the second seal means of the first housing against the first pipe and positioning of the first slip means of the first housing against the tubular member and the second slip means of the first housing against the first pipe, and second actuator means connected to the second housing and the tubular member for longitudinally moving the second housing relative to the tubular member for telescopically engaging the second pipe and positioning of the first seal means of the second housing against the tubular member and the second seal means of the second housing against the second pipe and positioning of the first slip means of the second housing against the tubular member and the second slip means of the second housing against the second pipe.

8. The connector of claim 8 including separate pistons actuating each of the slip means and seal means.

9. The connector of claim 8 including,
coacting locking means between each housing and each piston in the housing actuating a seal, engaging when the seal means are set.

10. The connector of claim 7 including,
a pipe engaging support connected to one end of each housing for engaging one of the pipes for aligning and supporting of the housing.

11. The connector of claim 7 wherein one end of each housing includes an interior surface surrounding the bore having first and second sections tapered inwardly for aligning a pipe inserted into said one end.

12. The connector of claim 11 wherein the first and second sections are separated by a uniform section.

13. The connector of claim 12 wherein the tapered section nearest the one end has a greater taper than the other tapered section.

14. The method of sealingly connecting the spaced ends of first and second pipes together with a pipe joint having a connector at each end of the pipe joint and longitudinally movable thereon, each connector having dual slip means and dual seal means comprising, retracting the connectors toward the center of the pipe joint, inserting the pipe joint between the ends of the first and second pipes, extending the connectors outwardly for enclosing the end of the first pipe in one connector and enclosing the end of the second pipe in the other connector, and hydraulically setting the dual slip means and dual seal means in each connector for gripping and sealing one of the slip means and one of the seal means against both ends of the pipe joint and the ends of the first and second pipes.

15. The method of claim 14 including,
aligning and supporting each of the connectors from the ends of the first and second pipes, respectively, when the pipe joint is inserted between the ends of the first and second pipes.

* * * * *

UNITED STATES PATENT AND TRADEMARK OFFICE
CERTIFICATE OF CORRECTION

PATENT NO. : 5,433,482
DATED : July 18, 1995
INVENTOR(S) : Alfred R. Baddour

It is certified that error appears in the above-indentified patent and that said Letters Patent is hereby corrected as shown below:

Column 2, line 66, delete "1A" and insert -- 11A --
Column 7, line 16, second occurrence of "8" should be -- 7 --

Signed and Sealed this

Twenty-ninth Day of October 1996

Attest:

BRUCE LEHMAN

Attesting Officer     Commissioner of Patents and Trademarks